D. P. O'BRIEN.
LEATHER MEASURING MACHINE.
APPLICATION FILED DEC. 20, 1916.
1,230,507.
Patented June 19, 1917.
3 SHEETS—SHEET 1.
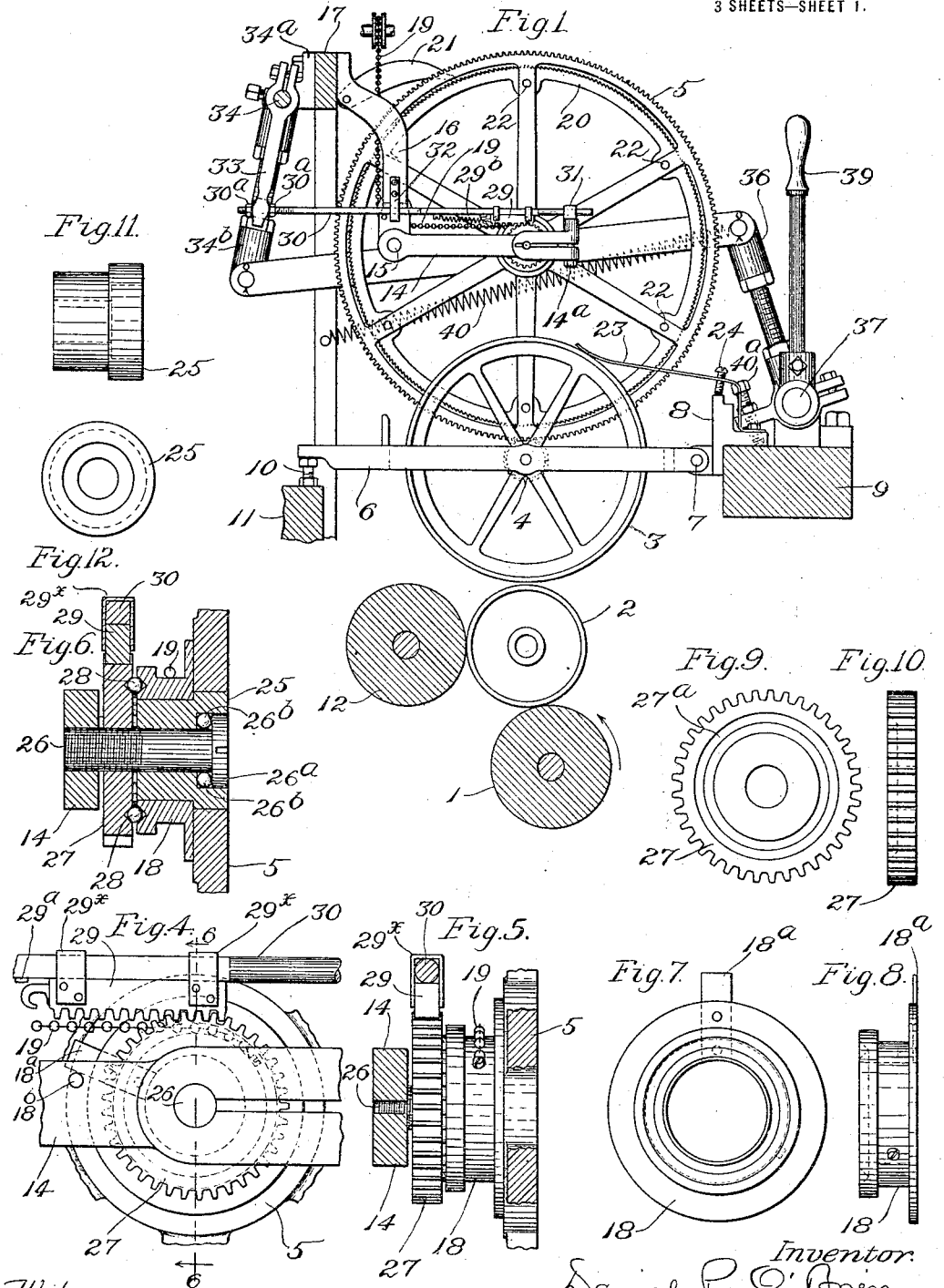

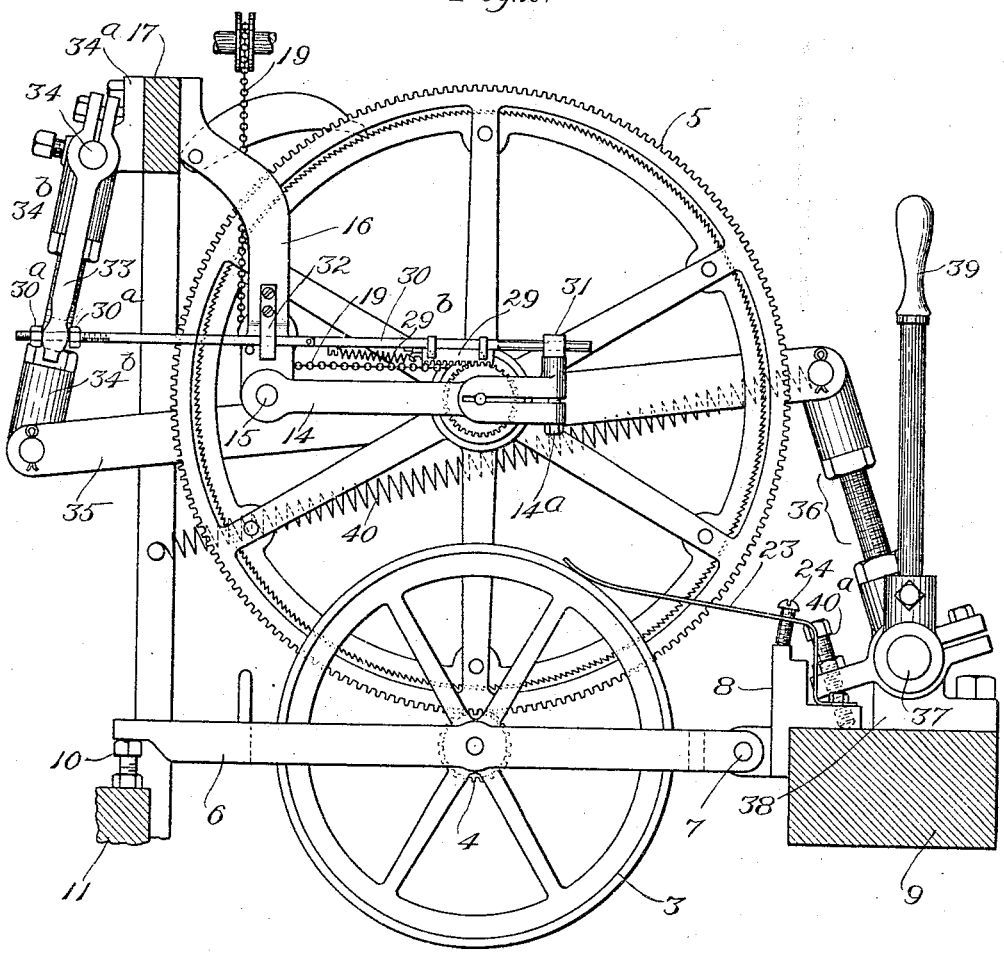

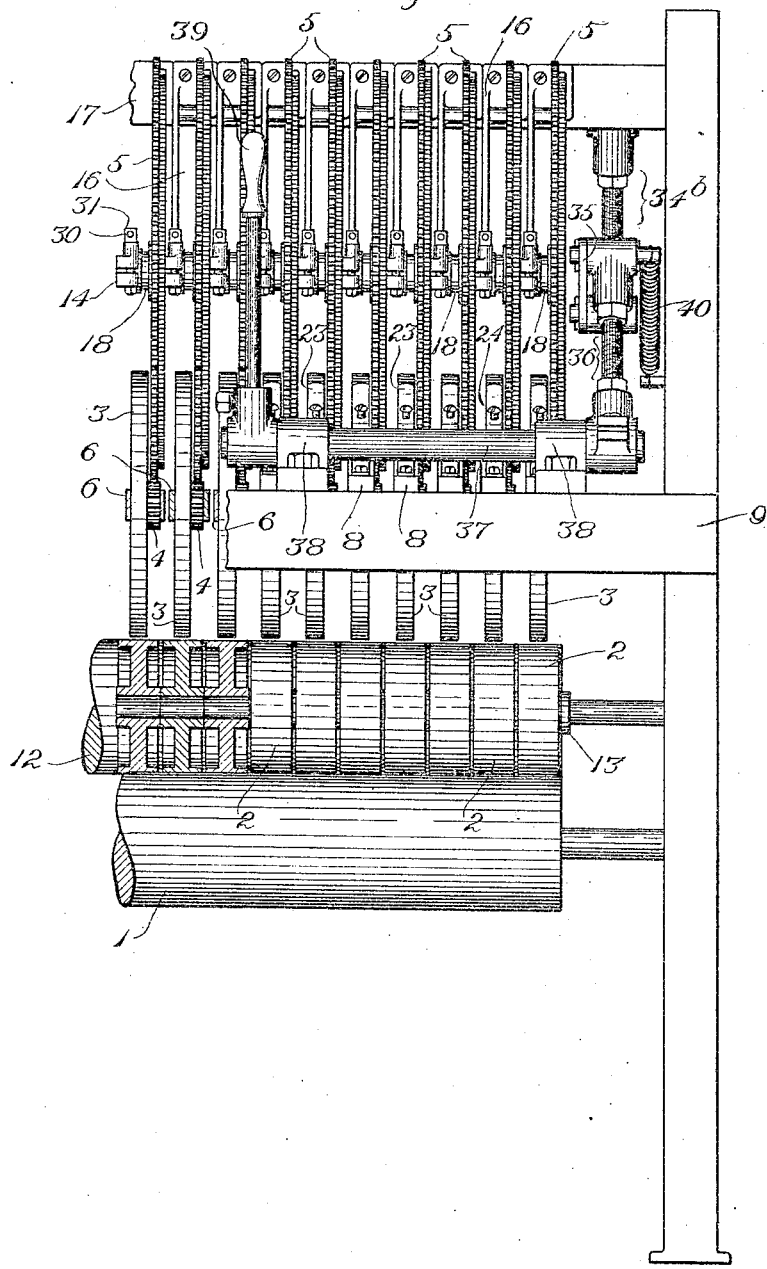

UNITED STATES PATENT OFFICE.

DANIEL P. O'BRIEN, OF WOBURN, MASSACHUSETTS, ASSIGNOR TO PEABODY WOBURN MACHINE COMPANY, OF PEABODY, MASSACHUSETTS, A CORPORATION OF MASSACHUSETTS.

LEATHER-MEASURING MACHINE.

1,230,507.   Specification of Letters Patent.   Patented June 19, 1917.

Application filed December 20, 1916. Serial No. 137,961.

*To all whom it may concern:*

Be it known that I, DANIEL P. O'BRIEN, a citizen of the United States, residing at Woburn, in the county of Middlesex, State of Massachusetts, have invented a certain new and useful Improvement in Leather-Measuring Machines, of which the following is a specification, reference being had therein to the accompanying drawings.

The invention has relation to leather measuring machines of the class operating to integrate the area of a sheet of leather by taking the measurement of the sheet in the simple passage of the latter through the machine.

The invention consists in an improved construction and arrangement whereby I provide for eliminating all openings or intervals between the measuring wheels which are acted upon by the sheet of leather in its passage and from which in turn the scale-rigging is actuated. It consists also in a novel and improved construction providing for distribution and reduction of the wear upon the teeth of the large toothed wheels which are employed intermediate the measuring wheels and the scale-rigging and through which the latter is operated.

An illustrative embodiment of the features of the invention is shown in the drawings, in which latter,—

Figure 1 is a view partly in vertical section and partly in side elevation of an organization comprising the said embodiment, only so much of a leather measuring machine as involves the features of the invention and certain of the associated parts being shown.

Fig. 2 is a view similar to Fig. 1, but omitting the measuring wheels and the feeding and supporting rolls, and on a somewhat larger scale.

Fig. 3 is a view mainly in front elevation but partly in transverse section of a portion of a leather measuring machine comprising the illustrative embodiment aforesaid.

Fig. 4 is a view in side elevation of the friction or clutch devices in connection with one of the chain-pulleys.

Fig. 5 is a view thereof looking from the right hand side in Fig. 4.

Fig. 6 is a view in vertical section in the plane indicated by dotted line 6—6 of Fig. 4.

Figs. 7 and 8 are a side view and an edge view, respectively, of a chain-pulley.

Figs. 9 and 10 are a side view and an edge view, respectively, of the toothed pinion forming an element of the friction or clutch devices which are combined with a chain-pulley.

Figs. 11 and 12 are respectively a front elevation and an end view of the hub employed in connection with a chain-pulley and the toothed wheel that is associated therewith.

Figs. 1 and 3 show at 1 a portion of a feed-roll, and at 2, 2, etc., measuring wheels above the said feed-roll and arranged to be acted upon by a sheet of leather passing between the feed-roll and the measuring wheels, as customary.

In carrying the invention into effect, I employ in conjunction with the measuring or contact wheels 2, 2, etc., disposed side by side in line with one another as heretofore, and as shown in the drawings, a supplemental series of wheels 3, 3, etc., having attached thereto the toothed pinions 4, 4, which engage and actuate the large toothed wheels 5, 5, etc., serving for the transmission of movement to elements of the scale-rigging. The supplemental wheels 3, 3, are adapted for frictional engagement by their peripheries with the peripheries of the measuring or contact rollers. They are narrower than the latter, as shown in Fig. 3, so that the combined width of a supplemental wheel 3, the pinion 4 connected therewith, and the arm 6 on which the wheel 3 and connected pinion 4 are pivotally mounted, is no greater than the width of the corresponding measuring or contact roller. The supporting arms 6, 6, etc., of the series of supplemental wheels are mounted pivotally at 7 upon small stands 8 which are supported by the rail 9 at the front of the machine. They are supported adjustably at their rear ends by the set-screws 10 applied to the back rail 11. The said set-screws provide for adjustment vertically of the supplemental wheels 3 with reference to the measuring wheels 2, as for the purpose of suiting the thickness of leather that is to be measured.

As shown in Fig. 3 the measuring wheels 2 are set close together, side by side, with their hubs touching but with their flanges separated from one another by a very narrow clearance space. The width of this space is slightly exaggerated in Fig. 3. This close setting of the measuring wheels is made possible by the employment of the supplemental wheels having the toothed pinions 4, 4, attached thereto. In prior constructions in which the toothed pinions have been attached directly to the measuring wheels it has been necessary to separate the measuring wheels transversely from one another far enough to admit of the introduction of large toothed wheels corresponding with those shown at 5, 5, between adjacent measuring wheels. The employment of the supplemental wheels, with the attachment of the toothed pinions thereto, obviates this wide spacing of the measuring wheels. The close setting of the measuring wheels, without openings or spaces between them, insures accurate measurement of the stock passed through the machine, and in the case of very light stock further insures accuracy by preventing the stock from forming wrinkles projecting in between the measuring wheels.

In the case of the organization shown in the drawings I employ a backing or supporting roll 12 conveniently mounted in the machine frame at the rear of the feed-roll 1 and set or series of measuring wheels 2, 2, and against the surface of which the measuring wheels 2 rest by the rear portions of their peripheries. The feed-roll 1 and backing-roll 12 serve conjointly to support the measuring wheels 2, 2, and keep them in their proper working relations without the employment of a supporting shaft for the measuring wheels. By dispensing with a supporting shaft for the measuring wheels I am enabled to take out and replace one or more of the said wheels without disturbing the others. End-guides 13, Fig. 3, supported conveniently in connection with the machine frame, serve to keep the measuring wheels from displacement lengthwise of the set or series, and to keep them with their hub-ends in close contact.

Each of the large toothed wheels 5 is journaled upon a supporting arm 14 which is pivoted at 15 to the lower end of a supporting arm 16 attached to a rail 17. The arm 14 is free to swing vertically around the pivot 15 so that the toothed wheel 5 rests by gravity upon the toothed pinion 4.

The chain-pulley 18 that is combined with a toothed wheel 5 has engaged therewith a chain or the like flexible connection 19 extending to and connecting with a suitable integrating mechanism, which may be any convenient scale-rigging.

As thus far described it will be perceived that a leather measuring machine embodying the first portion or feature of my invention comprises, in combination with suitable integrating devices, and a series of measuring or contact wheels disposed side by side in line with one another, a supplemental series of wheels adapted to make frictional contact by their peripheries with the peripheries of the measuring or contact wheels, toothed pinions operatively combined with the wheels of the said supplemental series, and toothed wheels engaged and actuated by the said pinions and operatively combined with the said integrating devices.

In prior machines of the same class as that which is partly shown in the drawings, the dogs or detents by means of which retrograde movement of the large toothed wheels is prevented have been arranged to engage with teeth of the same series that are engaged by the teeth of the actuating pinions. This has necessitated forming the said teeth as ratchet teeth for coöperation with the said dogs or detents, as well as making them small and close together, and in addition has necessitated making the teeth of the toothed pinions of corresponding shape and size for coöperation with the said ratchet-shaped teeth of the large toothed wheels. This construction involves various drawbacks, including tendency to rapid wear of the teeth of the toothed wheel and pinion, with resulting necessity for recutting or replacement. The small teeth are lacking in holding power and in strength. In accordance with one portion of my invention I employ a separate detent wheel or ring 20 for coöperation with the dog or detent 21. This detent or wheel or ring is made fast by rivets or bolts 22, 22, to the large toothed wheel 5. This construction enables the wheel 5 to be provided with large and strong gear-teeth suitable for coöperation with corresponding teeth formed upon the pinion 4, while the detent wheel or ring 20 is formed with ratchet-shaped teeth of suitable fineness for coöperation with the dog or detent 21.

Overrunning of the supplemental wheels 3, pinions 4, and large toothed wheels 5, is provided against by means of friction or brake springs 23 which are arranged to bear by their free ends upon the peripheries of the said wheels 3. These springs are mounted conveniently upon the small stands 8, and the degree of their pressure against the wheels 3 is regulated by means of adjusting screws 24, which fit screw-threaded holes that are tapped in the springs and make contact by their tips with the tops of the stands.

The improved construction providing for distributing around the peripheries of the large toothed wheels 5 the wear which is due to the engagement of the toothed pinions 4 with the teeth of the said large toothed wheels is shown applied in Figs. 1, 2 and 3. and the details thereof are represented in the remaining views. I combine the chain-wheels or pulleys 18 with the wheels 5 by means of clutch-devices, and I provide controlling devices in conjunction with the said clutch-devices whereby the chain-wheels or pulleys may be placed in and out of driving connection with the wheels 5. The parts are so combined and constructed that at the time of the passage of a piece of stock through the machine the chain-wheels or pulleys are clutched to the wheels 5 and are actuated therefrom so that in turn the scale-rigging is actuated to take the measurement of said piece. After the piece of stock has been measured tripping of the clutch-devices by the operator permits the scale-rigging to return to starting position while the toothed wheels remain at rest in the positions just assumed by them. Prior to taking another measurement the clutch-devices are tripped into operation to make the pulleys 18 fast to the wheels 5 and thereby connect the said wheels with the scale-rigging again. Wheels 5 are in mesh at all times with the pinions 4 of the measuring wheels. The clutch-connections therefor serve to connect the measuring wheels operatively with the pulleys 18 to which the chains of the scale-rigging are connected. The invention, accordingly, consists in part in the combination with a series of measuring wheels, and suitable scale-rigging, and a series of pulleys connected operatively with said scale-rigging, of clutch-connections for actuating the said pulleys from said measuring wheels, and clutch-controlling devices whereby said pulleys may be placed in and out of driving connection with the measuring wheels.

The clutch-devices and associated parts employed in carrying this portion of my invention into effect may be variously constructed and combined. In the illustrated embodiment of the invention, every chain-pulley 18 and its wheel 5 are arranged side by side upon a pivotal mounting, and with the pulley-and-wheel pair thus constituted a pressure-collar is combined, there being in addition means for operating said collar to produce or release frictional engagement between the pulley and the wheel. The detail views of the drawings show the large toothed wheel 5 furnished with a hub 25, such hub being shown detached in Figs. 11 and 12, Sheet 1, and being shown in its relations to one of such wheels in Fig. 6, same sheet. By means of the said hub the wheel 5 is mounted upon a pivot-screw 26 carried by the corresponding supporting arm 14. To prevent pivot-screw 26 from turning, the portion of arm 14 into which the pivot-screw screws is split, as shown, and provided with a screw 14ª by means of which the two divisions thereof may be drawn toward each other so as thereby to cramp the pivot-screw in manner to secure the said result. A portion of the hub 25 which is of reduced diameter projects laterally from the wheel 5, as shown in Fig. 6, and upon this laterally projecting portion of the hub the corresponding pulley 18 is sleeved. Upon the screw-threaded portion of the pivot-screw 26 a pressure-collar constituted by a nut 27 is mounted, between arm 14 and the adjacent side of the hub of pulley 18. The proximate faces of the nut 27 and the hub of pulley 18 are grooved annularly as shown in Figs. 6, 9 and 10, and the grooves of the two parts register with each other, forming a receway which is occupied by balls 28, 28, Fig. 6. The groove of nut 27 is marked 27ª in Fig. 9. The construction and arrangement are such that rotation of the nut in one direction upon the threaded portion of the pivot-screw causes the nut to shift laterally toward pulley 18, and in thus shifting apply pressure through the balls 28 to the hub of said pulley, and thereby force the said hub into close engagement with the shoulder of hub 25 located at the inner end of the reduced portion on which the hub of pulley 18 is mounted. In this manner the pulley 18 is frictionally clutched with the wheel 5 so as to be rotated by means of wheel 5 when the latter is rotated during the measuring action. Rotation of the nut in the other direction upon the threaded portion of the pivot-screw causes the nut to separate from the hub of pulley 18, thereby relieving such hub from the pressure which held it against the shoulder of hub 25 of wheel 5, and unclutching the pulley 18 from the wheel 5. To relieve the friction which would be likely to occur between hub 25 and the flange 26ª, Fig. 6, at the free end of pivot-screw 26, balls 26ᵇ, 26ᵇ, are interposed between such flange and the corresponding end of the hub. For the actuation of the nut it is formed as a toothed pinion, and its peripheral teeth are engaged by the teeth of a rack 29 carried by a rod 30. Guides 31, 32 for this rod are provided upon the front end of arm 14 and upon the supporting arm 16 with which such arm is connected pivotally. The said actuation of the nut is effected through endwise movement of the rack-rod and rack. To provide for this endwise movement the rear end of the rack-rod 30 is engaged with a depending arm 33 fixed upon a rockshaft 34 mounted in bearings 34ª at the rear of the series of wheels 5. A depending arm 34ᵇ fixed upon this rockshaft, at one end of the latter, is connected by means of a link 35 with an upstanding arm 36 carried by a rockshaft 37 mounted in bearings 38 at the front of the machine. This rock-shaft 37 is furnished with an operating handle 39 to be manipulated by the workman. Prior to taking a measurement the parts are operated to move the series of rack-rods in a proper direction to screw up the nuts 27 so as to clutch the pulleys 18 to the wheels 5. In this instance, the required movement of the said rack-rods is rearward. This movement may be produced by the operator, by moving the handle 39. In the illustrated machine provision is made for producing this movement automatically, namely by means of a contracting spiral spring 40 in connection with arm 36. A stop-screw 40ª carried by an arm projecting from rockshaft 37 serves by contact with rail 9 to limit the extent of the turning movement of such rockshaft that is produced by the action of the spring 40. Movement of the handle in the other direction by the operator serves to unscrew the nuts so as to unclutch the pulleys 18 from the wheels 5 to permit return of the scale-rigging to starting position. In order to compensate for variations of different kinds among the clutching devices of the series of pulleys and wheels, the action of screwing up the respective nuts is made yielding. Thus, each rack 29 is mounted by means of loops 29ˣ, 29ˣ, upon its supporting rod 30 with capacity to slide lengthwise thereon, and normally the rack is held rearward in contact with a fixed stop 29ª upon the rod by means of a contracting spiral spring 29ᵇ, Figs. 1 and 2. When the rod 30 is moved rearward this spring pulls the rack in the same direction in company with the rod, but the spring yields to permit the rack to lag behind as soon as the resistance offered by the nut to further turning becomes great enough to stretch the spring. Thereby breakage, bending of the parts, etc., are obviated in case one or more of the nuts cannot turn as far as some of the others. Adjustment of the individual clutch-nuts is provided for by screw-threading the rear end-portion of each rack-rod and applying nuts 30ª, 30ª, to such portion of the rod, at front and rear, respectively, of the actuating arm 33 through which the rod passes. Adjustment of the rack-rod endwise by means of the said nuts will have the effect of screwing the clutch-nut in one direction or the other along the pivot-screw.

To arrest the backward rotation of the pulleys 18 which is caused by the return of the scale-rigging to starting position after the unclutching of the clutch-pulleys, each pulley is furnished with a stop-projection 18ª, Figs. 4, 7 and 8, adapted to coöperate with a suitable stop-projection 18ᵇ, Fig. 4, carried by the arm 14 on which the pulley is mounted.

What is claimed is:—

1. A leather-measuring machine comprising, in combination with suitable integrating devices, and a series of measuring or contact wheels disposed side by side in line with one another, a supplemental series of wheels adapted to make frictional contact by their peripheries with the peripheries of the measuring or contact wheels, toothed pinions operatively combined with the wheels of said supplemental series, and toothed wheels engaged and actuated by the said pinions and operatively combined with said integrating devices.

2. A leather-measuring machine comprising, in combination with suitable integrating devices, and a series of measuring or contact-wheels disposed side by side in line with one another, a supplemental series of wheels adapted for frictional contact by their peripheries with the peripheries of the measuring or contact wheels, toothed pinions operatively combined with the wheels of the said supplemental series, toothed wheels engaged and operated by the said pinions and operatively connected to the said integrating devices for operating the latter, detent-wheels alongside said toothed wheels and connected with the latter, and detent-devices coöperating with the said detent wheels.

3. A leather-measuring machine comprising, in combination with a series of measuring-wheels and suitable scale-rigging, a series of pulleys operatively connected with said scale-rigging, clutch-connections for actuating said pulleys from said measuring-wheels, and clutch-controlling devices whereby said pulleys may be placed in and out of driving connection with said measuring-wheels.

4. A leather-measuring machine comprising, in combination with a series of measuring-wheels and suitable scale-rigging, a series of pulleys, flexible connections from said pulleys to said scale-rigging, clutch-connections for actuating said pulleys from said measuring-wheels, and means for closing and opening said clutches to thereby connect the pulleys operatively with the measuring-wheels, and release them.

5. A leather-measuring machine comprising, in combination with a series of measuring-wheels and suitable scale-rigging, a series of pulleys having flexible connections to said scale-rigging, a series of wheels driven from said measuring-wheels, clutch-connections between the respective pulleys and the respective driven wheels, and controlling means for said clutch-connections whereby said pulleys are connected operatively with their associated wheels, and released.

6. A leather-measuring machine comprising, in combination with a series of measuring-wheels and suitable scale-rigging, a series of pulleys having connections to said scale-rigging, a series of wheels driven from said measuring-wheels and having hubs on which said pulleys are mounted, friction-clutch-connections between the respective pulleys and the respective driven wheels, and controlling means for said friction-clutch-connections whereby frictional engagement between pulleys and wheels may be caused or released.

7. A leather-measuring machine comprising, in combination with a series of measuring wheels and suitable scale-rigging, a series of pulleys having connections with said scale-rigging, a series of wheels alongside of said pulleys and in operative connection with said measuring-wheels, pivotal mountings for the respective pulley-and-wheel pairs, a pressure-collar for each pair, and means for operating said collar to produce or release frictional engagement between pulley and wheel of the pair.

8. A leather-measuring machine comprising, in combination with a series of measuring-wheels and suitable scale-rigging, a series of pulleys in operative connection with said scale-rigging, a series of wheels alongside of said pulleys and in operative connection with the measuring-wheels, pivotal mountings for the respective pulley-and-wheel pairs, a pressure-collar for each pair in screw-threaded engagement with the corresponding pivotal mounting, and means for rotating the collars to cause or relieve engagement between pulley and wheel.

9. A leather-measuring machine comprising, in combination with a series of measuring-wheels and suitable scale-rigging, a series of pulleys in operative connection with said scale-rigging, a series of wheels alongside of said pulleys and in operative connection with said measuring-wheels, a pressure-collar for each pulley-and-wheel pair, and a controlling-handle for the series of collars to produce actuation of the latter to cause or relieve engagement between the pulley and wheel of each pair.

10. A leather-measuring machine comprising, in combination with a series of measuring-wheels and suitable scale-rigging, a series of pulleys in operative connection with said scale-rigging, a series of wheels alongside of said pulleys and in operative connection with said measuring-wheels, pivotal mountings for the respective pulley-and-wheel pairs, a pressure-collar for each pair in screw-threaded engagement with the corresponding pivotal mounting, means for rotating the series of pressure-collars to cause or relieve engagement between the respective pulleys and wheels, and a controlling-handle for said means.

11. A leather-measuring machine comprising, in combination with suitable integrating devices, a series of measuring or contact-wheels, toothed pinions operatively combined with the said wheels and actuated therefrom, toothed wheels engaged and actuated by the said pinions and operatively connected with the said integrating devices for operating the latter, separately-formed detent-wheels alongside said toothed wheels and connected with the latter, and detent-devices coöperating with the said detent-wheels.

In testimony whereof I affix my signature in presence of two witnesses.

DANIEL P. O'BRIEN.

Witnesses:
CHAS. F. RANDALL,
ELLEN O. SPUNG.

Copies of this patent may be obtained for five cents each, by addressing the "Commissioner of Patents, Washington, D. C."